United States Patent
Kim

(10) Patent No.: US 9,603,005 B2
(45) Date of Patent: Mar. 21, 2017

(54) METHOD OF SIM CONTROL AND ELECTRONIC DEVICE THEREOF

(71) Applicant: Samsung Electronics Co., Ltd., Gyeonggi-do (KR)

(72) Inventor: Hyun-Il Kim, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/583,067

(22) Filed: Dec. 24, 2014

(65) Prior Publication Data

US 2015/0181411 A1  Jun. 25, 2015

(30) Foreign Application Priority Data

Dec. 24, 2013  (KR) .................. 10-2013-0162189

(51) Int. Cl.
*H04W 8/18* (2009.01)
(52) U.S. Cl.
CPC .................. *H04W 8/183* (2013.01)
(58) Field of Classification Search
USPC ........................................... 370/338
See application file for complete search history.

(56) References Cited

U.S. PATENT DOCUMENTS

2008/0064443 A1* 3/2008 Shin .................. H04M 1/72519
455/558
2013/0196621 A1* 8/2013 Guday .................. H04W 24/02
455/406
2013/0217424 A1  8/2013 Kim

FOREIGN PATENT DOCUMENTS

KR  10-2011-0056164  5/2011

* cited by examiner

*Primary Examiner* — Marcos Batista

(57) ABSTRACT

An apparatus and method for controlling a Subscriber Identity Module (SIM) card usage in an electronic device are provided. The method of controlling the SIM card usage in the electronic device may include, if a network usage request is generated, determining whether to change a SIM card in use based on a SIM card usage condition, and if the SIM card in use is changed, performing the network usage request by using the changed SIM card. In addition, the apparatus and method for controlling the SIM card usage in the electronic device can be implemented according to the various exemplary embodiments of the present disclosure.

16 Claims, 14 Drawing Sheets

| NO | SIM INFORMATION ‑ 801 | | | | | |
|---|---|---|---|---|---|---|
| | FREE OFFER AMOUNT | | | ADDITIONAL FEE | | |
| | CALL (MINUTE) | TEXT (PIECES) | DATA (MB) | CALL (1 SECOND) | TEXT (PER PIECE) | DATA (1KB) |
| 1 | 200 | 200 | 200 | 1.8 WON | 20 WON | 20 WON |
| 2 | 100 | 100 | 100 | 1 WON | 5 WON | 10 WON |
| 3 | ZERO | ZERO | ZERO | 2 WON | 10 WON | 15 WON |
| ... | ... | ... | ... | ... | ... | ... |

FIG.8

METHOD OF SIM CONTROL AND ELECTRONIC DEVICE THEREOF

PRIORITY

The present application is related to and claims the priority under 35 U.S.C. §119(a) to a Korean Patent Application filed in the Korean Intellectual Property Office on Dec. 24, 2013, and assigned Serial No. 10-2013-0162189, the contents of which are herein incorporated by reference.

TECHNICAL FIELD

The present disclosure relates to a method of a SIM control and an electronic device thereof.

BACKGROUND

Electronic devices provide various services such as audio and video call functions, information input and output functions, and data transmission and reception.

The electronic device uses a service of a corresponding vendor through a subscriber identity module (SIM) card. In this case, since the SIM card exists for each vendor, users inconveniently replace the SIM card to use the service of the corresponding vendor.

Accordingly, the users use an electronic device capable of employing a plurality of SIM cards. In this case, when the users use call, text, and data services, a process of determining which SIM card will be used is required.

SUMMARY

As described above, in order to use a service of another vendor while using any one of a plurality of subscriber identity module (SIM) cards in an electronic device, which SIM card will be used has to be determined again inconveniently.

To address the above-discussed deficiencies, it is a primary object to provide an apparatus and method for controlling a SIM card change based on a SIM card condition in an electronic device.

Another aspect of the present disclosure is to provide an apparatus and method for controlling a SIM card change based on each SIM card's free offer amount in an electronic device.

Another aspect of the present disclosure is to provide an apparatus and method for controlling a SIM card change based on each SIM card's usage fee in an electronic device.

Another aspect of the present disclosure is to provide an apparatus and method for controlling a SIM card change based on an error occurrence of a SIM card in an electronic device.

Another aspect of the present disclosure is to provide an apparatus and method for controlling a SIM card change based on network connection quality of a SIM card in an electronic device.

Another aspect of the present disclosure is to provide an apparatus and method for displaying a menu for changing a SIM card in an electronic device.

In accordance with an aspect of the present disclosure, a method of controlling a SIM card usage in an electronic device is provided. The method includes, if a network usage request is generated, determining whether to change a SIM card in use based on a SIM card usage condition, and if the SIM card in use is changed, performing the network usage request by using the changed SIM card.

In the aforementioned aspect of the present disclosure, the determining of whether to change the SIM card may include confirming whether there is a remaining balance of a free usage amount of the SIM card in use, and if there is no remaining balance of the free usage amount of the SIM card in use, determining whether to change to a different SIM card having the remaining balance of the free usage amount.

In addition, the method may further include, if there is no remaining balance of the free usage amount of all SIM cards, comparing each SIM card's usage fee, and determining whether to change to a SIM card having a cheapest usage fee based on the comparison result.

In addition, the determining of whether to change the SIM card may include comparing each SIM card's usage fee, and determining whether to change to a SIM card having a cheapest usage fee based on the comparison result.

In addition, the determining of whether to change the SIM card may include, if a network usage error occurs, determining whether to change to a different SIM card.

In addition, the determining of whether to change the SIM card may include comparing a network connection state and reference quality, and if the network connection state is lower in quality than the reference quality, determining whether to change to a different SIM card.

In addition, the determining of whether to change the SIM card may include displaying a menu for confirming whether to change the SIM card, and determining whether to change the SIM card based on a selection of the displayed menu.

In addition, the method may further include, if the SIM card in use is changed, displaying that the SIM card is changed.

In accordance with another aspect of the present disclosure, an electronic device for controlling a SIM card usage is provided. The electronic device includes a memory, a communication module, a display, and at least one processor for, if a network usage request is generated, determining whether to change a SIM card in use based on a SIM card usage condition, and if the SIM card in use is changed, providing control to perform the network usage request via the communication module by using the changed SIM card.

In the aforementioned aspect of the present disclosure, the processor may confirm whether there is a remaining balance of a free usage amount of the SIM card in use in the memory, and if there is no remaining balance of the free usage amount of the SIM card in use, may determine whether to change to a different SIM card having the remaining balance of the free usage amount.

In addition, if there is no remaining balance of the free usage amount of all SIM cards, the processor may compare each SIM card's usage fee stored in the memory, and may determine whether to change to a SIM card having a cheapest usage fee based on the comparison result.

In addition, the processor may compare each SIM card's usage fee stored in the memory, and may determine whether to change to a SIM card having a cheapest usage fee based on the comparison result.

In addition, if a network usage error occurrence is confirmed via the communication module, the processor may determine whether to change to a different SIM card.

In addition, the processor may confirm a network connection state via the communication module and compare the network connection state with reference quality stored in the memory, and if the network connection state is lower in quality than the reference quality, may determine whether to change to a different SIM card.

In addition, the processor may provide control to display a menu for confirming whether to change the SIM card via the display, and may determine whether to change the SIM card based on a selection of the displayed menu.

In addition, if the SIM card in use is changed, the processor may control the display to display that the SIM card is changed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a screen configuration in which SIM card information is input in an electronic device according to various exemplary embodiments of the present disclosure.

DETAILED DESCRIPTION

Figure 1:
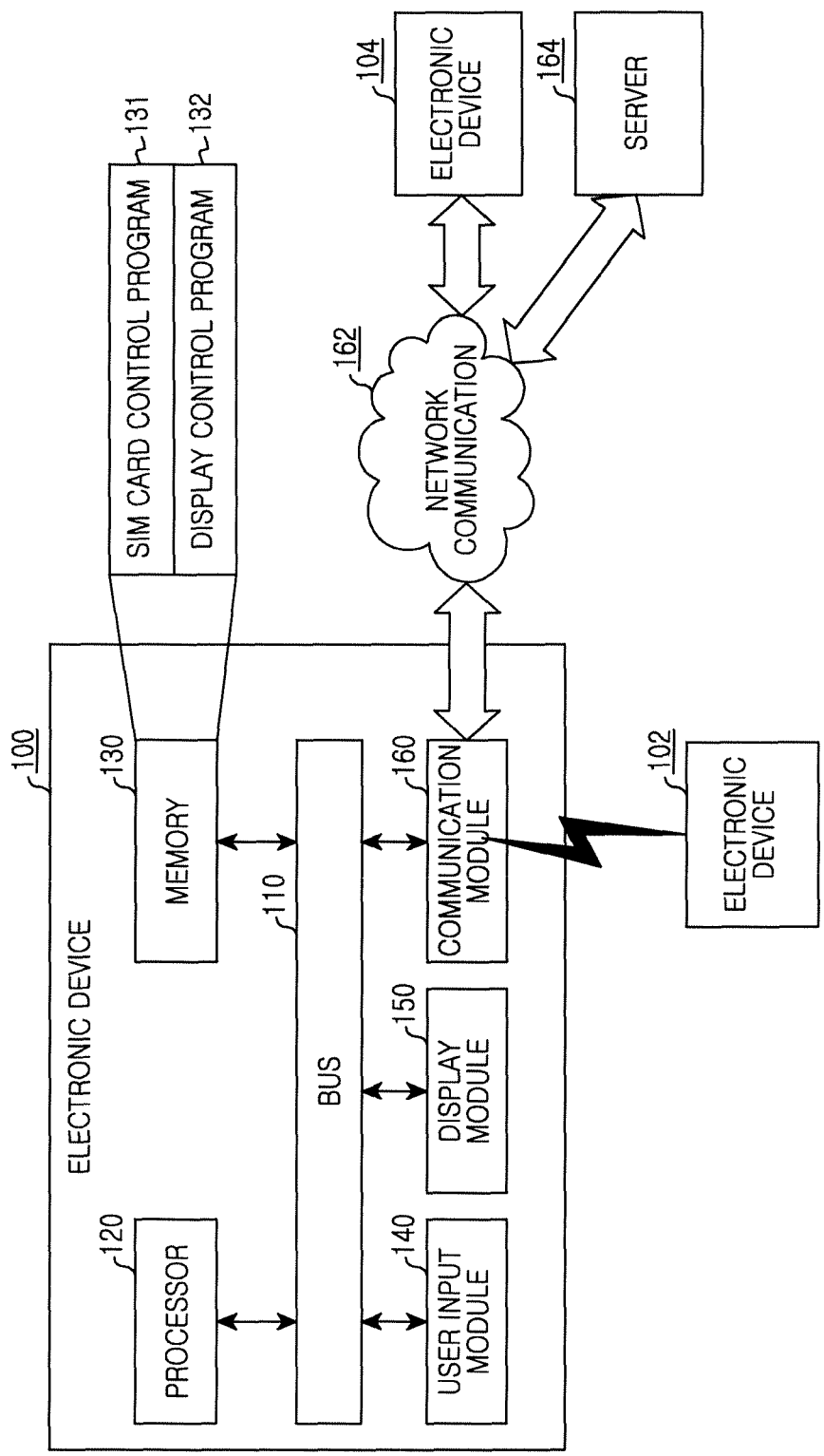
FIG. 1 is a block diagram of an electronic device according to various exemplary embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, various exemplary embodiments of the present disclosure are described with reference to the accompanying drawings. While the present disclosure is susceptible to various modifications and alternative forms, various exemplary embodiments thereof have been shown by way of example in the drawings and will herein be described in detail. It should be understood, however, that it is not intended to limit the various exemplary embodiments of the present disclosure to the particular form disclosed, but, on the contrary, the present disclosure is to cover all modifications, equivalent, and alternatives falling within the spirit and scope of the present disclosure as defined by the appended claims. Like reference numerals denote like constitutional elements throughout the drawings.

An electronic device according to various exemplary embodiments of the present disclosure may be one or more combinations of various devices such as a smart phone, a tablet personal computer (PC), a mobile phone, a video phone, an e-book reader, a desktop PC, a laptop PC, a netbook computer, a personal digital assistant (PDA), a portable multimedia player (PMP), a MPEG-1 Audio Layer 3 (MP3) player, a mobile medical device, an electronic bracelet, an electronic necklace, an electronic appcessory, a camera, a wearable device, an electronic clock, a wrist watch, a smart white appliance (e.g., a refrigerator, an air conditioner, a cleaner, an artificial intelligent robot, a television (TV), a digital video disk (DVD) player, an audio, an oven, a microwave oven, a washing machine, an air purifier, an electronic picture frame, etc.), various medical devices (e.g., magnetic resonance angiography (MRA), magnetic resonance imaging (MRI), computed tomography (CT), imaging equipment, ultrasonic instrument, etc.), a navigation device, a global positioning system (GPS) receiver, an event data recorder (EDR), a flight data recorder (FDR), a set-top box, a TV box (e.g., Samsung HomeSync™, Apple TV™, or Google TV™), an electronic dictionary, a car infotainment device, an electronic equipment for ship (e.g., a vessel navigation device, a gyro compass, etc.), avionics, a security device, an electronic costume, an electronic key, a camcorder, game consoles, a head-mounted display (HMD), a flat panel display device, an electronic album, a furniture or a part of building/constructions including a communication function, an electronic board, an electronic signature receiving device, a projector, and the like. It is apparent to those ordinarily skilled in the art that the electronic device according to the present disclosure is not limited to the aforementioned devices.

FIG. 1 is a block diagram of an electronic device according to various exemplary embodiments of the present disclosure.

Referring to FIG. 1, an electronic device 100 may include a bus 110, a processor 120, a memory 130, a user input module 140, a display module 150, or a communication module 160.

The bus 110 may be a circuit for connecting the aforementioned constitutional elements (e.g., the bus 110, the processor 120, the memory 130, the user input module 140, the display module 150, or the communication module 160) and for delivering communication (e.g., a control message) between the aforementioned constitutional elements.

Figure 2:
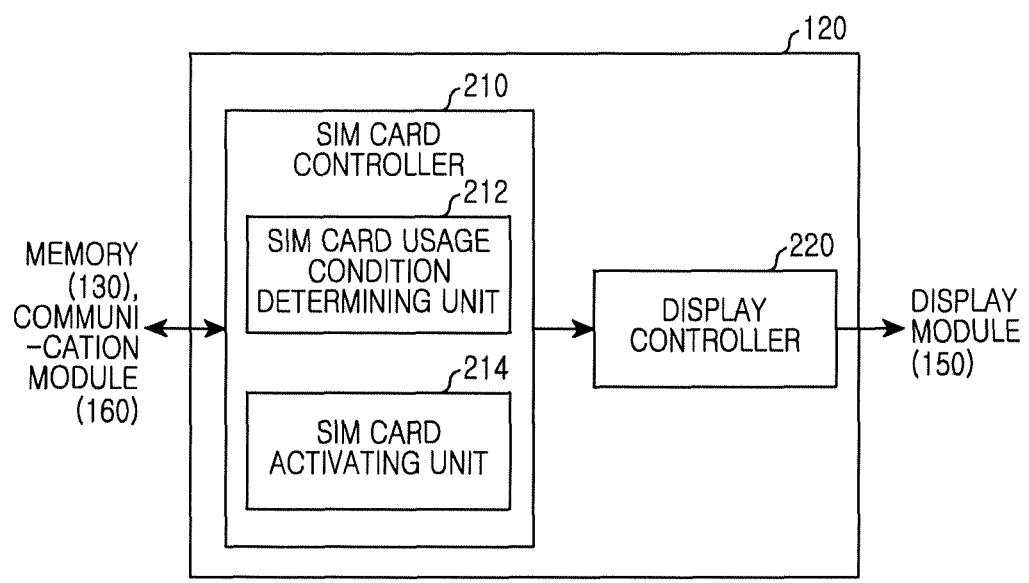
FIG. 2 is a block diagram of a processor according to various exemplary embodiments of the present disclosure.

The processor 120 may receive an instruction from other constitutional elements included in the electronic device 100, and may interpret the received instruction and execute an arithmetic operation or data processing according to the interpreted instruction. In this case, the processor 120 executes at least one application stored in the memory 130 and provides a service according to the application. For example, the processor 120 may be configured as illustrated in FIG. 2 to control a subscriber identity module (SIM) card usage by executing a SIM card control program 131 and a display control program 132.

In addition, the processor 120 may include one or more application processors (APs) or one or more communication processors (CPs). Herein, the AP and the CP may be included in the processor 120 or may be included respectively in different integrated circuit (IC) packages. In addition, the AP and the CP may be included in one IC package. The AP may control a plurality of hardware or software constitutional elements connected to the AP by driving an operating system or an application program, and may process a variety of data including multimedia data and may perform an arithmetic operation. Herein, the AP may be implemented with a system on chip (SoC). In addition, the CP may perform at least a part of a multimedia control function. In addition, the CP may identify and authenticate a terminal in a communication network by using a subscriber identity module (e.g., SIM card). In this case, the CP may provide a service including a voice call, a video call, a text message, or packet data to a user. In addition, the CP may control data transmission/reception of the communication module 160. The AP or the CP may load an instruction or data, which is received from each non-volatile memory connected thereto or at least one of different constitutional elements, to a volatile memory and may process the instruction or data. In addition, the AP or the CP may store data, which is received from at least one of different constitutional elements or generated by at least one of different constitutional elements, in the non-volatile memory. The CP may perform a function of managing a data link and changing a communication protocol in communication between different electronic devices connected through a network to an electronic device including hardware elements. Herein, the CP may be implemented with an SoC. In addition, the processor 120 may further include a Graphic Processing Unit (GPU).

The memory 130 may store an instruction or data received from the processor 120 or other constitutional elements (e.g., the user input module 140, the display module 150, and the communication module 160) or generated by the processor 120 or other constitutional elements. In this case, the memory may include an internal buffer and an external butter. For example, the memory 130 may store SIM card information including each SIM card's free offer amount and usage fee. Herein, the free offer amount may include at least one free offer amount among a call, a text, and data. In addition, the usage fee may include at least one of the call, the text, and the data.

In addition, the memory 130 may include the SIM card control program 131 and the display control program 132. In this case, each application may be configured with a programming module, and each programming module may be configured in software, firmware, hardware, or at least two or more of combinations thereof.

The SIM card control program 131 includes at least one software constitutional element for determining a usage of any one SIM card based on a SIM card usage condition among a plurality of SIM cards. For example, if a network usage request is generated, the SIM card control program 131 may confirm whether to change a SIM card based on at least one condition among each SIM card's free usage amount, usage fee, occurrence or non-occurrence of network error, and network connection quality. In this case, if the SIM card is changed, the SIM card control program 131 may provide control to activate the changed SIM card via the communication module 160.

More specifically, if a free usage amount of a SIM card currently in an activation state is fully used, the SIM card control program 131 may provide control to display a menu for confirming whether to change to the SIM card which has a remaining balance of the free usage amount by confirming whether there is a SIM card which does not fully use its free usage amount under the control of the display control program 132.

In addition, if the free usage amount is fully used in all SIM cards, the SIM card control program 131 may provide control to display a menu for confirming whether to change to a SIM card having a cheap usage fee by comparing usage fees of respective SIM cards under the control of the display control program 132.

In addition, if an error occurs when it is attempted to use a network by using a SIM card which is currently in an activation state, the SIM card control program 131 may provide control to display a menu for confirming whether to change to a different SIM card under the control of the display control program 132.

In addition, if a network connection state (i.e., a connection response time, transfer rate, signal strength, noise with respect to a base station (BS)) is lower in quality than reference quality, the SIM card control program 131 may provide control to display the menu for confirming whether to change to the different SIM card under the control of the display control program 132.

The display control program 132 includes at least one software constitutional element for controlling at least one piece of display data through the display module 150. For example, the display control program 132 may provide control to display at least one piece of display data through the display module 150. In this case, the display control program 132 may display a menu for confirming a SIM card change through the display module 150 under the control of the SIM card control program 131.

The memory 130 may include an internal memory or an external memory. The internal memory may include at least one of a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, etc.). In this case, the internal memory may have a form of a solid state drive (SSD). The external memory may further include compact flash (CF), secure digital (SD), micro secure digital (Micro-SD), mini secure digital (Mini-SD), extreme digital (xD), memory stick, and the like.

In addition, the memory 130 may further include a kernel, a middleware, and an application programming interface (API). The kernel may control or manage system resources (e.g., the bus 110, the processor 120, or memory 130) used to execute an operation or function implemented in the remaining other programming modules (e.g., the middleware, the API, or the application). In addition, the kernel may provide a controllable or manageable interface by accessing individual constitutional elements of the electronic device 100 in the middleware, the API, or the application. The middleware may perform an intermediary role so that the API or the application communicates with the kernel to exchange data. In addition, the middleware may perform load balancing for the task request by using a method of assigning a priority capable of using a system resource (e.g., the bus 110, the processor 120, or memory 130) of the electronic device 100. The API may include at least one interface or function for file control, window control, video processing, or character control, and the like, as an interface capable of controlling a function provided by the application in the kernel or the middleware.

The user input module 140 may receive an instruction or data from a user and deliver the instruction to the processor 120 or the memory 130 via the bus 110. For example, the user input module 140 may include a touch panel, a pen sensor, a key, or an ultrasonic input unit. For example, the touch panel may recognize a touch input by using at least one of an electrostatic type, a pressure-sensitive type, and an ultrasonic type. Herein, the touch panel may further include a controller. In case of the electrostatic type, not only direct touch but also proximity recognition is also possible. The touch penal may further include a tactile layer. In this case, the touch panel may provide the user with a tactile reaction. For example, the pen sensor may be implemented by using the same or similar method of receiving a touch input of the user or by using an additional sheet for recognition. For example, the key may include a keypad or a touch key. For example, the ultrasonic input unit is a device by which the electronic device detects a sound wave through a microphone by using a pen which generates an ultrasonic signal, and is a device capable of radio recognition.

The display module 150 may display image, video, or data to the user. For example, the display module 150 may include a panel or a hologram. For example, the panel may be a liquid-crystal display (LCD) or an active-matrix organic light-emitting diode (AM-OLED). In addition, the panel may be implemented in a flexible, transparent, or wearable manner. Herein, the panel may be constructed as one module with the touch panel. For example, the hologram may use an interference of light and show a stereoscopic image in the air. In addition, the display module 150 may further include a control circuit for controlling the panel or the hologram.

In addition, the display module 150 may display a content under the control of the display control program 132. In this case, the display module 150 may display a menu for confirming a SIM card change.

The communication module 160 may connect communication between a different electronic device 102 or 104 and the electronic device 100. In this case, the communication module 160 may support a specific local area communication protocol (e.g., wireless fidelity (WiFi), bluetooth (BT), near field communication (NFC), or specific network communication 162 (e.g., internet, local area network (LAN), wide area network (WAN), telecommunication network, cellular network, satellite network, plain old telephone service (POTS), etc.).

Each of the different electronic devices 102 and 104 may be a device which is the same (e.g., the same type) as the electronic device 100 or may be a different (e.g., a different type) device.

In addition, the electronic device may further include a sensor module. The sensor module may include at least one of a gesture sensor, a gyro sensor, a pressure sensor, a magnetic sensor, an acceleration sensor, a grip sensor, a proximity sensor, a red, green, blue (RGB) sensor, a bio sensor, a temperature/humidity sensor, an illumination sensor, and an ultra violet (UV) sensor. In addition, the sensor module may measure a physical quantity or detect an operation state of the electronic device, and thus may convert the measured or detected information into an electric signal. For example, the sensor module 240 include an e-nose sensor, an electromyography (EMG) sensor, an electroencephalogram (EEG) sensor, an electrocardiogram (ECG) sensor, a fingerprint sensor, and the like. In addition, the sensor module may further include a control circuit for controlling at least one or more sensors included therein.

Names of the aforementioned constitutional elements of the hardware according to the present disclosure may vary depending on a type of the electronic device. The hardware of the present disclosure may include at least one of the aforementioned constitutional elements. Some of the constitutional elements may be omitted, or additional other constitutional elements may be further included. In addition, some of the constitutional elements of the hardware of the present disclosure may be combined and constructed to one entity, so as to equally perform functions of corresponding constitutional elements before combination.

FIG. 2 is a block diagram of a processor according to various exemplary embodiments of the present disclosure.

Referring to FIG. 2, a processor 120 includes a SIM card controller 210 and a display controller 220.

The SIM card controller 210 executes the SIM card control program 131 stored in the memory 130 and thus determines to use any one SIM card based on a SIM card usage condition among a plurality of SIM cards. For example, if a network usage request is generated, the SIM card controller 210 may confirm whether to change a SIM card based on at least one condition among each SIM card's free usage amount, usage fee, occurrence or non-occurrence of network error, and network connection quality. In this case, if the SIM card is changed, the SIM card controller 210 may provide control to activate the changed SIM card via the communication module 160.

More specifically, if a free usage amount of a SIM card currently in an activation state is fully used, the SIM card controller 210 may provide control to display a menu for confirming whether to change to the SIM card which has a remaining balance of the free usage amount by confirming whether there is a SIM card which does not fully use its free usage amount under the control of the display controller 220.

In addition, if the free usage amount is fully used in all SIM cards, the SIM card controller 210 may provide control to display a menu for confirming whether to change to a SIM card having a cheap usage fee by comparing usage fees of respective SIM cards under the control of the display controller 220.

In addition, if an error occurs when it is attempted to use a network by using a SIM card which is currently in an activation state, the SIM card controller 210 may provide control to display a menu for confirming whether to change to a different SIM card under the control of the display controller 220.

In addition, if a network connection state (i.e., a connection response time, transfer rate, signal strength, noise with respect to a BS) is lower in quality than reference quality, the SIM card controller 210 may provide control to display the menu for confirming whether to change to the different SIM card under the control of the display controller 220.

In addition, the SIM card controller 210 may further include a SIM card usage condition determining unit 212 and a SIM card activating unit 214. In this case, the SIM card usage condition determining unit 212 may confirm whether to change a SIM card based on at least one condition among each SIM card's free usage amount, usage fee, occurrence or non-occurrence of network error, and network connection quality. In addition, the SIM card activating unit 214 may provide control to activate the changed SIM card via the communication module 160 under the control of the SIM card usage condition determining unit 212.

The display controller 220 provides control to display data to be displayed via the display module 150 by executing the display control program 132 stored in the memory 130. For example, the display controller 220 may provide control to display at least one piece of data to be displayed via the display module 150. In this case, the display controller 220 may display a menu for confirming a SIM card change via the display module 150 under the control of the SIM card controller 210.

Figure 3:
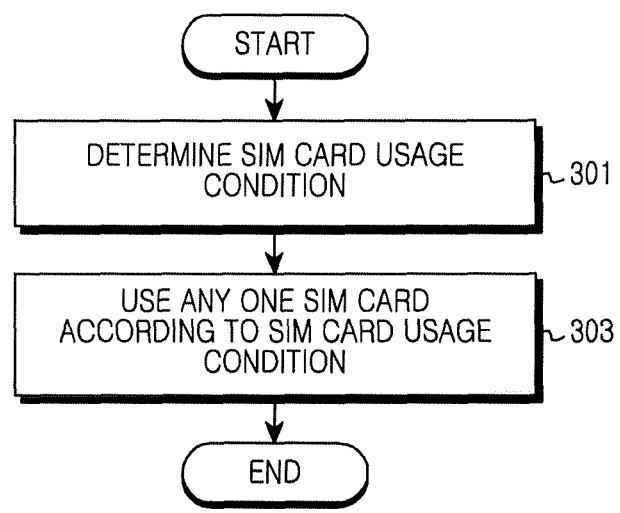
FIG. 3 illustrates a process of determining a usage of any one subscriber identity module (SIM) card among a plurality of SIM cards based on a SIM card usage condition in an electronic device according to various exemplary embodiments of the present disclosure.

FIG. 3 illustrates a process of determining a usage of any one SIM card among a plurality of SIM cards based on a SIM card usage condition in an electronic device according to various exemplary embodiments of the present disclosure.

Referring to FIG. 3, the electronic device determines a SIM card usage condition in step 301. For example, if a network usage request is generated, the electronic device may determine the SIM card usage condition based on at least one condition among each SIM card's free usage amount, usage fee, occurrence or non-occurrence of network error, and network connection quality.

In step 303, the electronic device determines any one SIM card to be used in the electronic device among a plurality of SIM cards based on the SIM card usage condition. For example, if a network usage request is generated, the electronic device may use a network by activating any one SIM card based on at least one condition among each SIM card's free usage amount, usage fee, occurrence or non-occurrence of network error, and network connection quality.

Figure 4:
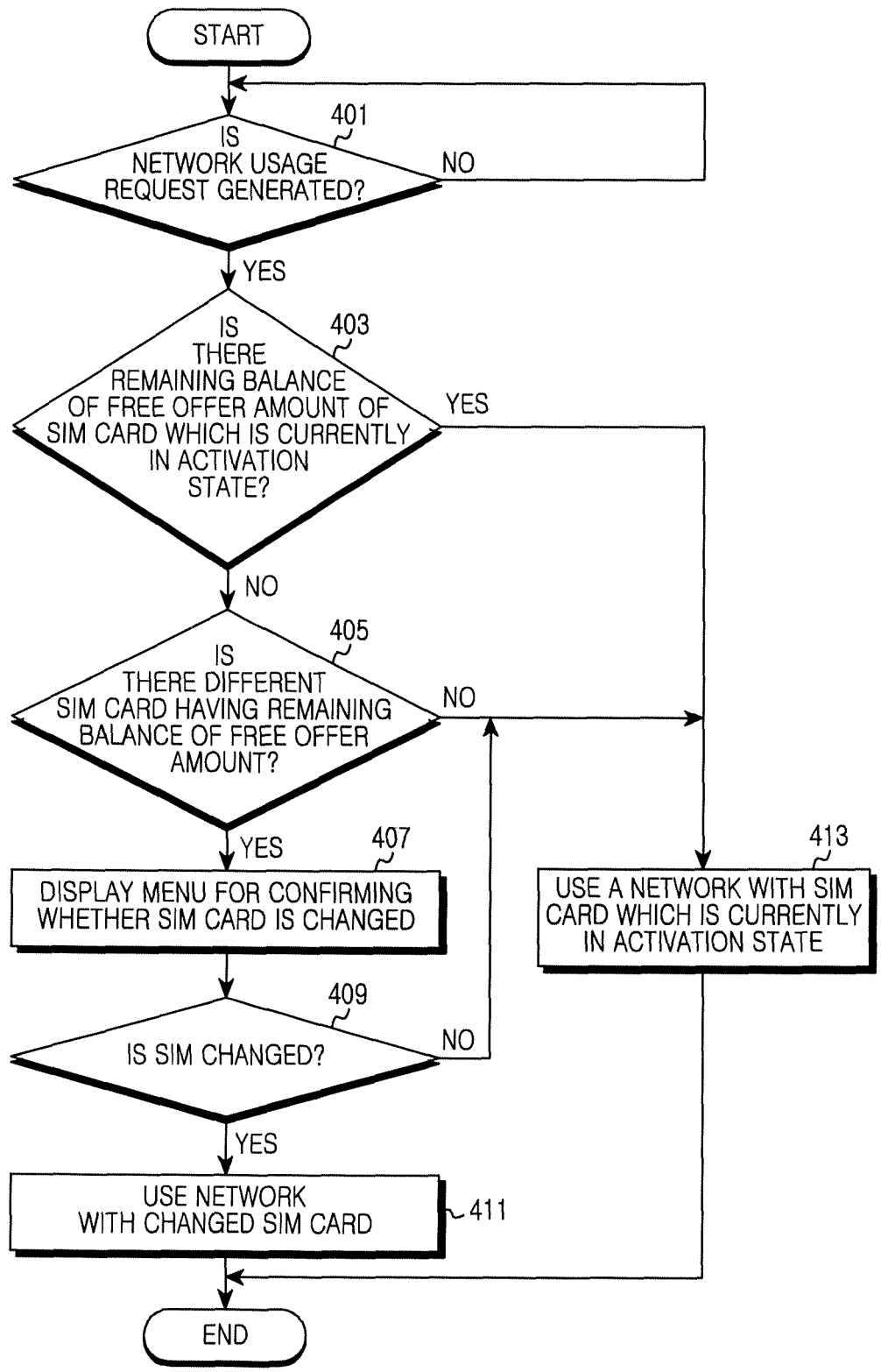
FIG. 4 illustrates a process of determining a usage of any one SIM card among a plurality of SIM cards based on each SIM card's free usage amount in an electronic device according to various exemplary embodiments of the present disclosure.

FIG. 4 illustrates a process of determining a usage of any one SIM card among a plurality of SIM cards based on each SIM card's free usage amount in an electronic device according to various exemplary embodiments of the present disclosure.

Referring to FIG. 4, the electronic device confirms whether a network usage request is generated in step 401. For example, the electronic device may confirm whether the network usage request is generated to provide at least one service among a text service, a call service, and a data service. In this case, the electronic device may periodically confirm whether the network usage request is generated.

If the network usage request is generated, in step 403, the electronic device confirms whether there is a remaining balance of a free offer amount of the SIM card which is currently in an activation state. Herein, as illustrated in FIG. 8, it is assumed that a memory of the electronic device stores "SIM information" 801 including a free offer amount 811 for a call 813, a text 815, and data 817 of each SIM card 833, 835, or 837 placed in the electronic device. It is assumed herein that the "SIM information" is input by a user, or is pre-stored in a system, or is transmitted from a server. In addition, it is assumed that the memory of the electronic device stores remaining balance information (not shown) of the free offer amount 811 of each SIM card 833, 835, or 837.

If the remaining balance of the free offer amount exists for the SIM card which is currently in the activation state, in step 413, the electronic device uses a network with the SIM card which is currently in the activation state.

Otherwise, if the remaining balance of the free offer amount does not exist for the SIM card which is currently in the activation state, in step 405, the electronic device confirms whether there is a different SIM card having the remaining balance of the free offer amount.

If the different SIM card having the remaining balance of the free offer amount does not exist, in step 413, the electronic device uses the network with the SIM card which is currently in the activation state.

Figure 9A:
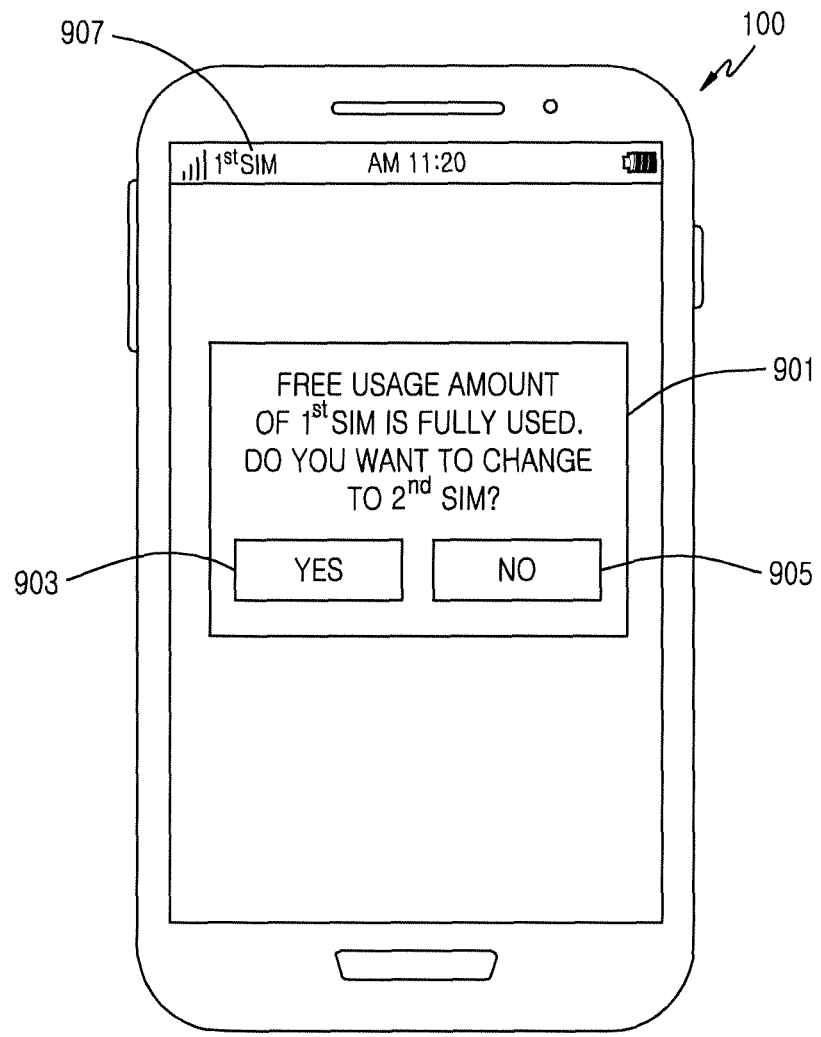
FIGS. 9A through 10 illustrate a screen configuration for determining a usage of any one SIM card among a plurality of SIM cards based on a SIM card usage condition in an electronic device according to various exemplary embodiments of the present disclosure.

Otherwise, if the different SIM card having the remaining balance of the free offer amount exists, in step 407, the electronic device displays a menu for confirming whether the SIM card is changed. For example, as illustrated in FIG. 9A, since the SIM card (i.e., $1^{st}$ SIM) which is currently in the activation state is fully used, the electronic device may display a menu 901 for confirming whether to change to the different SIM card (i.e., $2^{nd}$ SIM) having the remaining balance of the free offer amount. In this case, as illustrated in FIG. 9A, the electronic device may display information of the SIM card (i.e., $1^{st}$ SIM), which is currently in the activation state, in a notification area (see 907).

In step 409, the electronic device confirms whether the SIM card is changed. For example, as illustrated in FIG. 9A, the electronic device may confirm whether to change the SIM card based on any one of a "yes" 903 and a "no" 905 selected from the menu 901 for confirming the SIM card change. In addition, if any one of the "yes" 903 and the "no" 905 is not selected during a reference time, the electronic device may release the display of the menu 901 for confirming the SIM card change.

If the SIM card is not changed, in step 413, the electronic device uses the network with the SIM card which is currently in the activation state. For example, as illustrated in FIG. 9A, if the "no" 905 is selected from the menu 901 for confirming the SIM card change, the electronic device may use the network with the SIM card (i.e., $1^{st}$ SIM) which is currently in the activation state.

Figure 9B:
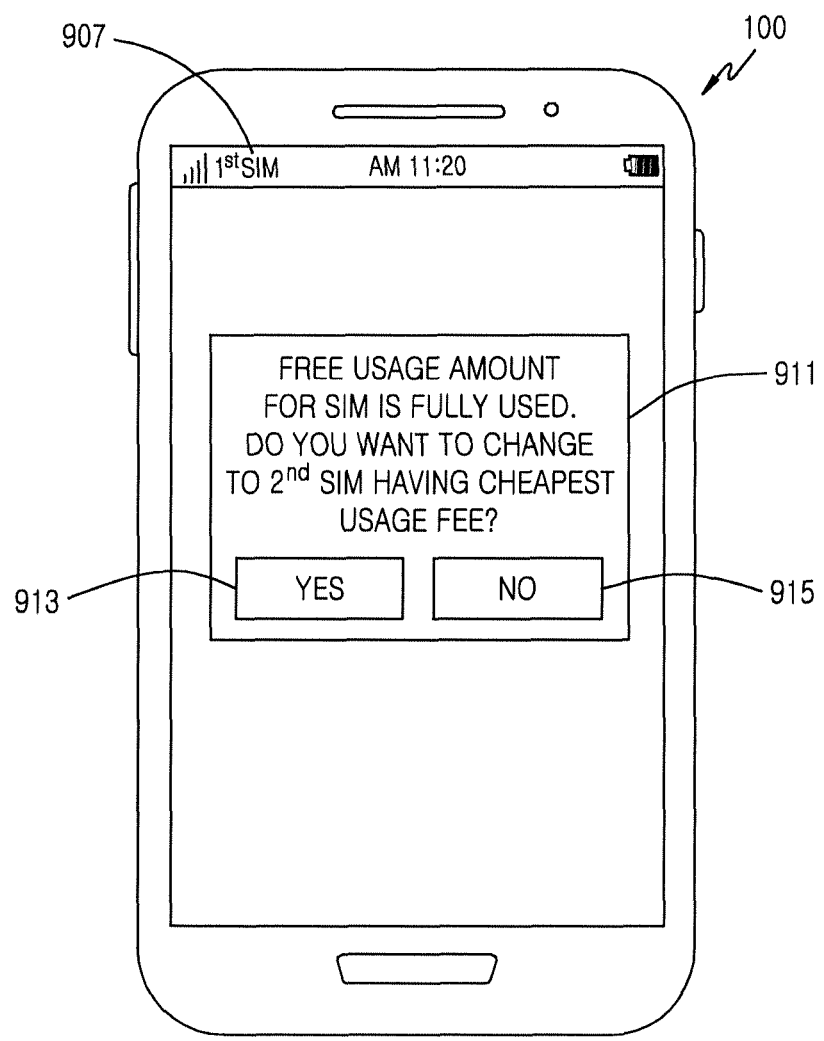
Figure 9C:
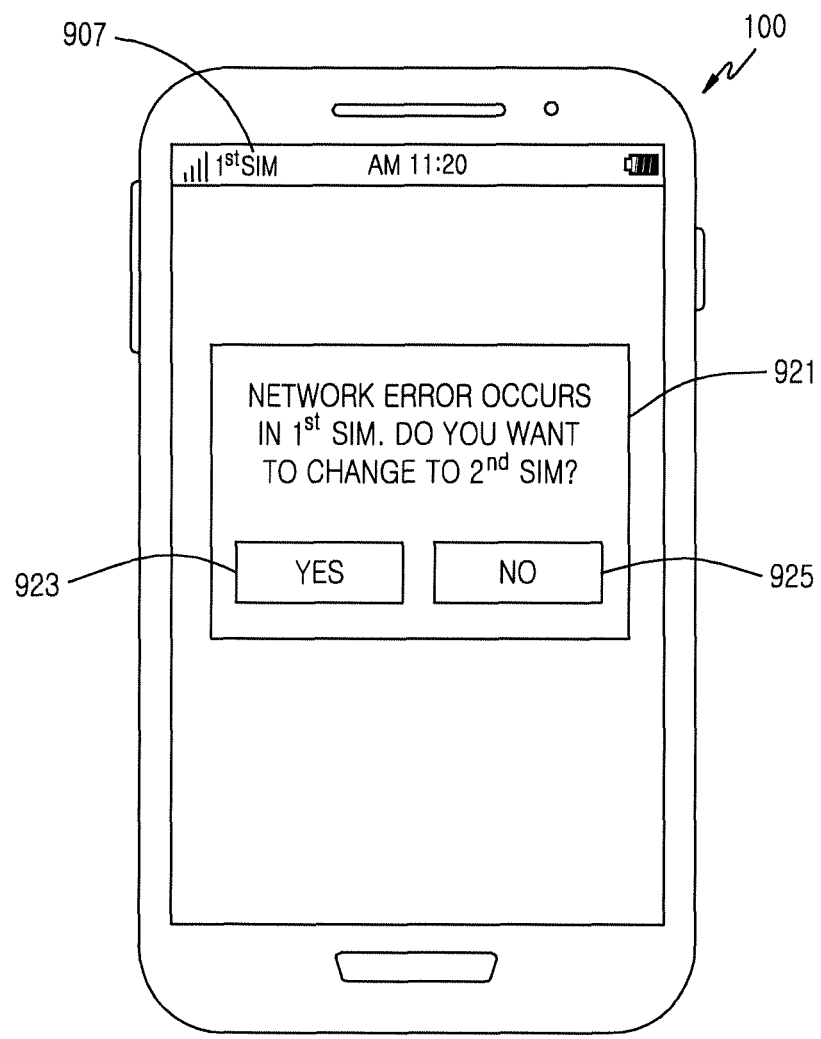
Figure 9D:
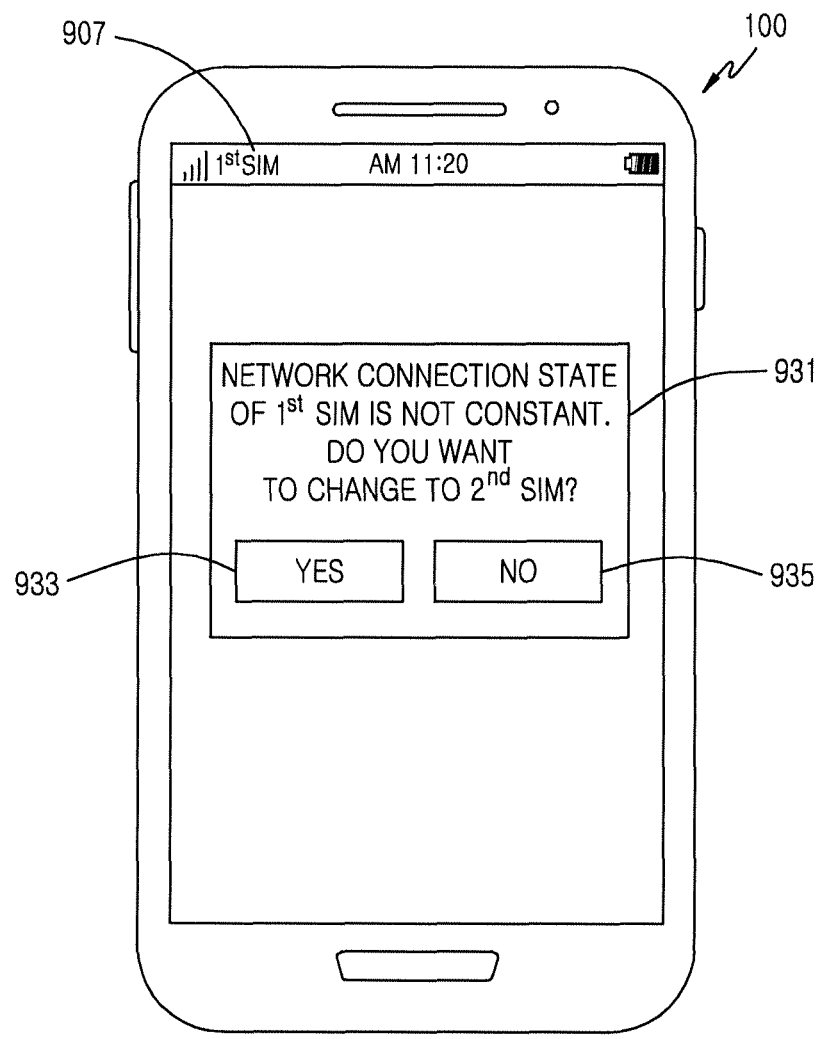
Figure 9E:
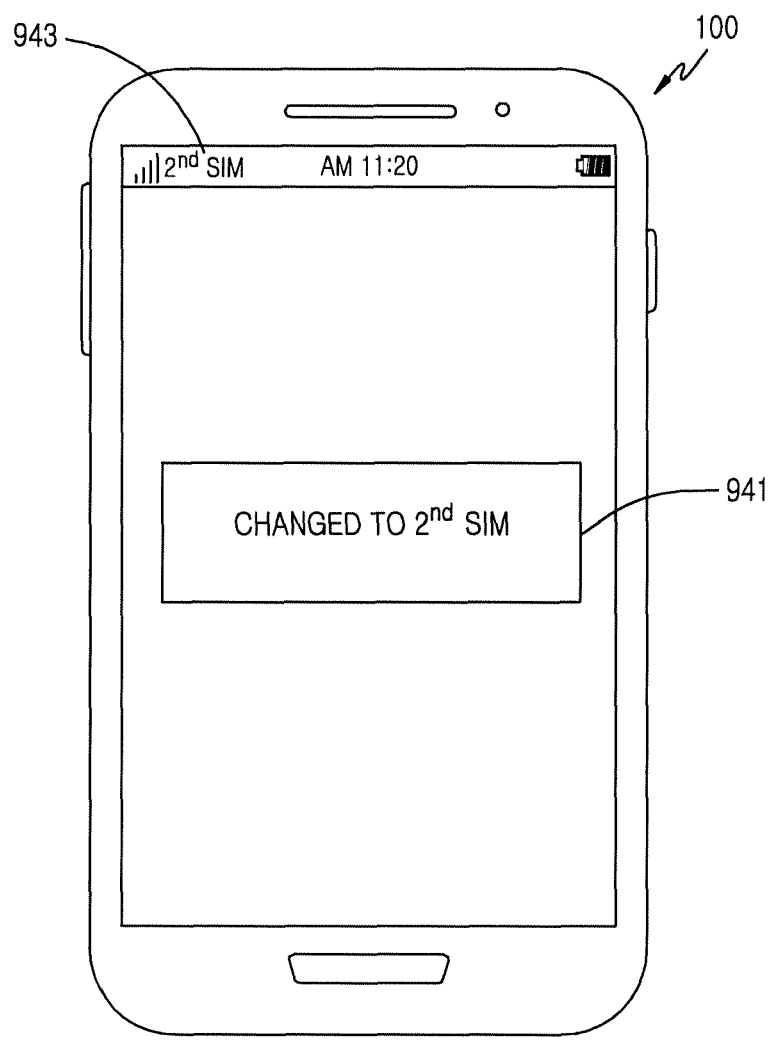

Otherwise, if the SIM card is changed, in step 411, the electronic device uses the network with the changed SIM card. For example, as illustrated in FIG. 9A, if the "yes" 903 is selected from the menu 901 for confirming the SIM card change, the electronic device may use the network by changing to the SIM card (i.e., $2^{nd}$ SIM) having the remaining balance of the free offer amount. In this case, as illustrated in FIG. 9E, the electronic device may display a notification window 941 for notifying the change to the $2^{nd}$ SIM. In addition, as illustrated in FIG. 9E, the electronic device may display the change to the $2^{nd}$ SIM in a notification area (see 943).

In the aforementioned exemplary embodiment, the electronic device provides a SIM card selection menu to use the network by using the SIM card having the remaining balance of the free offer amount.

Figure 5:
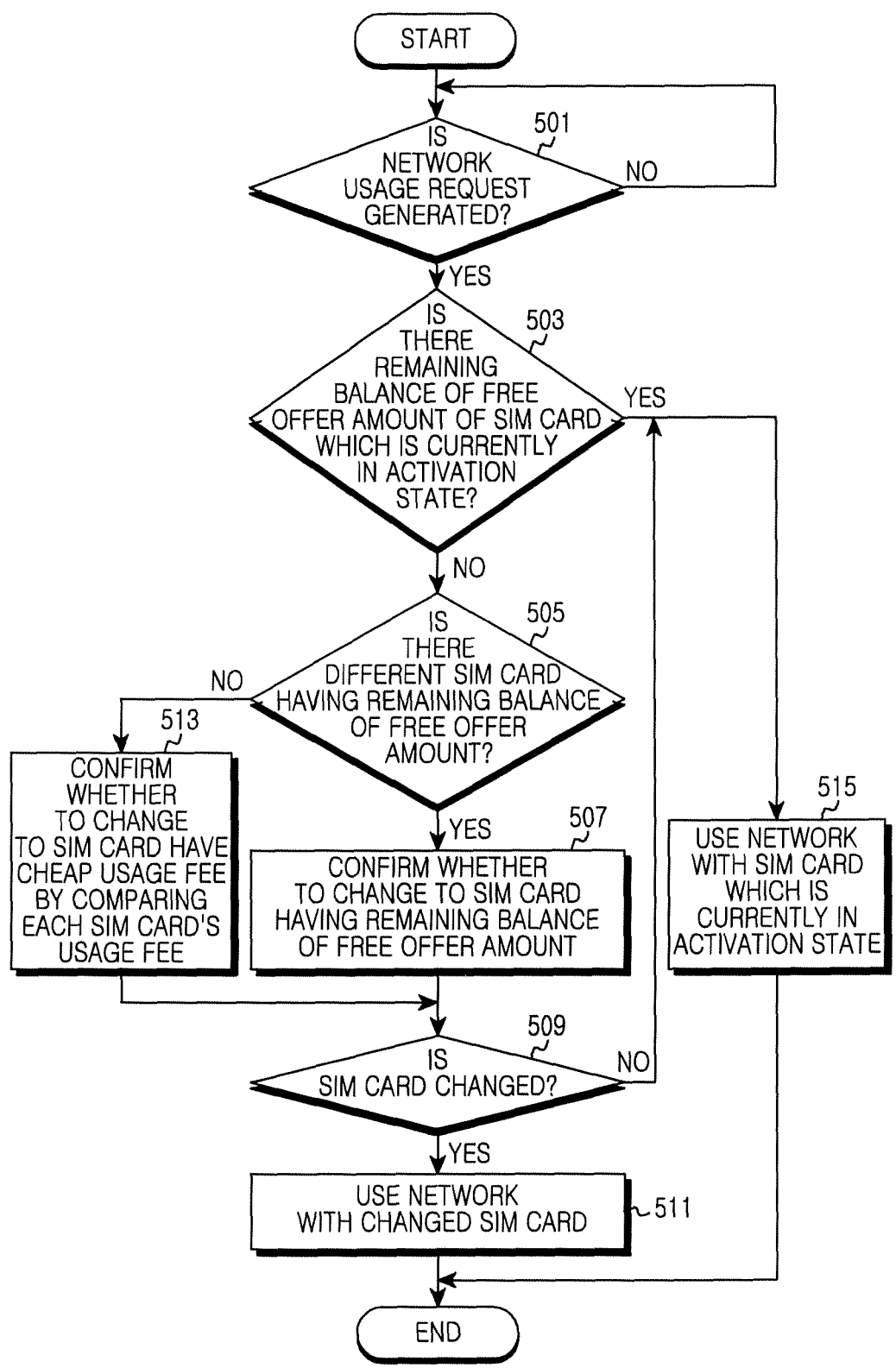
FIG. 5 illustrates a process of determining a usage of any one SIM card among a plurality of SIM cards based on each SIM card's usage fee in an electronic device according to various exemplary embodiments of the present disclosure.

In another exemplary embodiment, as illustrated in FIG. 5, the electronic device may provide the SIM card selection menu to use the network by using a SIM card having a cheap usage fee.

FIG. 5 illustrates a process of determining a usage of any one SIM card among a plurality of SIM cards based on each SIM card's usage fee in an electronic device according to various exemplary embodiments of the present disclosure.

Referring to FIG. 5, the electronic device confirms whether a network usage request is generated in step 501. For example, the electronic device may confirm whether the network usage request is generated to provide at least one service among a text service, a call service, and a data service. In this case, the electronic device may periodically confirm whether the network usage request is generated.

If the network usage request is generated, in step 503, the electronic device confirms whether there is a remaining balance of a free offer amount of the SIM card which is currently in an activation state. Herein, as illustrated in FIG. 8, it is assumed that a memory of the electronic device stores "SIM information" 801 including a free offer amount 811 for a call 813, a text 815, and data 817 of each SIM card 833, 835, or 837 placed in the electronic device. It is assumed herein that the "SIM information" is input by a user, or is pre-stored in a system, or is transmitted from a server. In addition, it is assumed that the memory of the electronic device stores remaining balance information (not shown) of the free offer amount 811 of each SIM card 833, 835, or 837.

If the remaining balance of the free offer amount exists for the SIM card which is currently in the activation state, in step 515, the electronic device uses a network with the SIM card which is currently in the activation state.

Otherwise, if the remaining balance of the free offer amount does not exist for the SIM card which is currently in the activation state, in step 505, the electronic device confirms whether there is a different SIM card having the remaining balance of the free offer amount.

Otherwise, if the different SIM card having the remaining balance of the free offer amount exists, in step 507, the electronic device displays a menu for confirming whether to change to the SIM card having the remaining balance of the free offer amount. For example, as illustrated in FIG. 9A, since the SIM card (i.e., $1^{st}$ SIM) which is currently in the activation state is fully used, the electronic device may display a menu 901 for confirming whether to change to the different SIM card (i.e., $2^{nd}$ SIM) having the remaining balance of the free offer amount. In this case, as illustrated in FIG. 9A, the electronic device may display information of the SIM card (i.e., $1^{st}$ SIM), which is currently in the activation state, in a notification area (see 907).

Otherwise, if the different SIM card having the remaining balance of the free offer amount does not exist, in step 513, the electronic device displays a menu for confirming whether to change to a SIM card having a cheap usage fee by comparing each SIM card's usage fee. For example, as illustrated in FIG. 9B, since the free usage amount is fully used in all SIM cards, the electronic device may display a menu 911 for confirming whether to change to the SIM card (i.e., $2^{nd}$ SIM) of which the usage fee is the cheapest. In this case, as illustrated in FIG. 9B, the electronic device may display information of the SIM card (i.e., $1^{st}$ SIM), which is currently in the activation state, in the notification area (see 907). Herein, as illustrated in FIG. 8, it is assumed that a memory of the electronic device stores "SIM information" 801 including a usage fee 821 for a call 813, a text 815, and data 817 of each SIM card 833, 835, or 837 placed in the electronic device. It is assumed herein that the "SIM information" is input by a user, or is pre-stored in a system, or is transmitted from a server. In addition, a monetary unit of the usage fee 821 may be changed by using a country code based on BS information or a current location of the electronic device.

In step 509, the electronic device confirms whether the SIM card is changed. For example, as illustrated in FIG. 9A or FIG. 9B, the electronic device may confirm whether to change the SIM card based on any one of the "yes" 903 or 913 and the "no" 905 or 915 selected from the menu 901 or 911 for confirming the SIM card change. In addition, if any one of the "yes" 903 or 913 and the "no" 905 or 915 is not selected during a reference time, the electronic device may release the display of the menu 901 or 911 for confirming the SIM card change.

If the SIM card is not changed, in step 515, the electronic device uses the network with the SIM card which is currently in the activation state. For example, as illustrated in FIG. 9A or FIG. 9B, if the "no" 905 or 915 is selected from the menu 901 or 911 for confirming the SIM card change, the electronic device may use the network with the SIM card (i.e., $1^{st}$ SIM) which is currently in the activation state.

Otherwise, if the SIM card is changed, in step 511, the electronic device uses the network with the changed SIM card. For example, as illustrated in FIG. 9A or FIG. 9B, if the "yes" 903 or 913 is selected from the menu 901 or 911 for confirming the SIM card change, the electronic device may use the network by changing to the SIM card (i.e., $2^{nd}$ SIM) having the remaining balance of the free offer amount. In this case, as illustrated in FIG. 9E, the electronic device may display a notification window 941 for notifying the change to the $2^{nd}$ SIM. In addition, as illustrated in FIG. 9E, the electronic device may display the change to the $2^{nd}$ SIM in a notification area (see 943).

In the aforementioned exemplary embodiment, if the SIM card having the remaining balance of the free offer amount does not exist, the electronic device may confirm whether to change to the SIM card having the cheap usage fee by comparing each SIM card's usage fee.

In another exemplary embodiment, the electronic device may confirm whether to change to the SIM card having the cheap usage fee by comparing each SIM card's usage fee.

Figure 6:
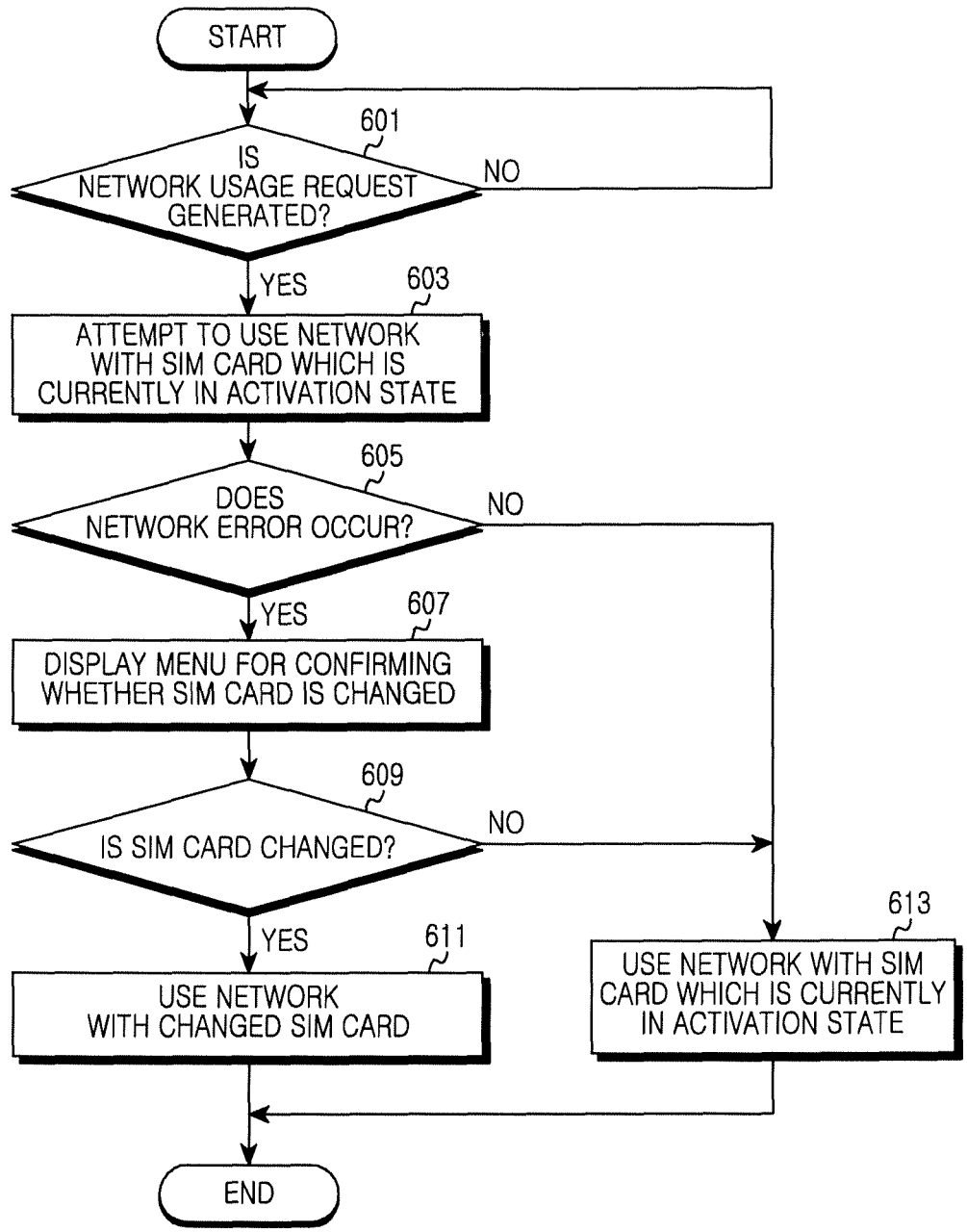
FIG. 6 illustrates a process of changing to a different SIM card when a network error occurs in an electronic device according to various exemplary embodiments of the present disclosure.

In another exemplary embodiment, as illustrated in FIG. 6, the electronic device may confirm whether to change the SIM card when a network error occurs.

FIG. 6 illustrates a process of changing to a different SIM card when a network error occurs in an electronic device according to various exemplary embodiments of the present disclosure.

Referring to FIG. 6, the electronic device confirms whether a network usage request is generated in step 601. For example, the electronic device may confirm whether the network usage request is generated to provide at least one service among a text service, a call service, and a data service. In this case, the electronic device may periodically confirm whether the network usage request is generated.

If the network usage request is generated, in step 603, the electronic device attempts to use a network with a SIM card which is currently in an activation state. For example, the electronic device may attempt to use the network by using the SIM card which is currently in the activation state to provide at least one service among a text service, a call service, and a data service.

In step 605, the electronic device may confirm whether the network error occurs. It is assumed herein that network error information is input by a user, or is pre-stored in a system, or is transmitted from a server.

If the network error does not occur, in step 613, the electronic device uses the network with the SIM card which is currently in the activation state.

Otherwise, if the network error occurs, in step 607, the electronic device displays a menu for confirming whether the SIM card is changed. For example, as illustrated in FIG. 9C, since the network error occurs even if it is attempted to use the network with the SIM card (i.e., $1^{st}$ SIM) which is currently in the activation state, the electronic device may display a menu 921 for confirming whether to change to the different SIM card (i.e., $2^{nd}$ SIM). In this case, as illustrated in FIG. 9C, the electronic device may display information of the SIM card (i.e., SIM), which is currently in the activation state, in a notification area (see 907).

In step 609, the electronic device confirms whether the SIM card is changed. For example, as illustrated in FIG. 9C, the electronic device may confirm whether to change the SIM card based on any one of a "yes" 923 and a "no" 925 selected from the menu 921 for confirming the SIM card change. In addition, if any one of the "yes" 923 and the "no" 925 is not selected during a reference time, the electronic device may release the display of the menu 921 for confirming the SIM card change.

If the SIM card is not changed, in step 613, the electronic device uses the network with the SIM card which is currently in the activation state. For example, as illustrated in FIG. 9C, if the "no" 925 is selected from the menu 921 for confirming the SIM card change, the electronic device may use the network with the SIM card (i.e., $1^{st}$ SIM) which is currently in the activation state.

Otherwise, if the SIM card is changed, in step 611, the electronic device uses the network with the changed SIM card. For example, as illustrated in FIG. 9C, if the "yes" 923 is selected from the menu 921 for confirming the SIM card change, the electronic device may use the network by changing to the SIM card (i.e., $2^{nd}$ SIM). In this case, as illustrated in FIG. 9E, the electronic device may display a notification window 941 for notifying the change to the $2^{nd}$ SIM. In addition, as illustrated in FIG. 9E, the electronic device may display the change to the $2^{nd}$ SIM in a notification area (see 943).

In the aforementioned exemplary embodiment, the electronic device confirms whether to change the SIM card according to the network error occurrence.

Figure 7:
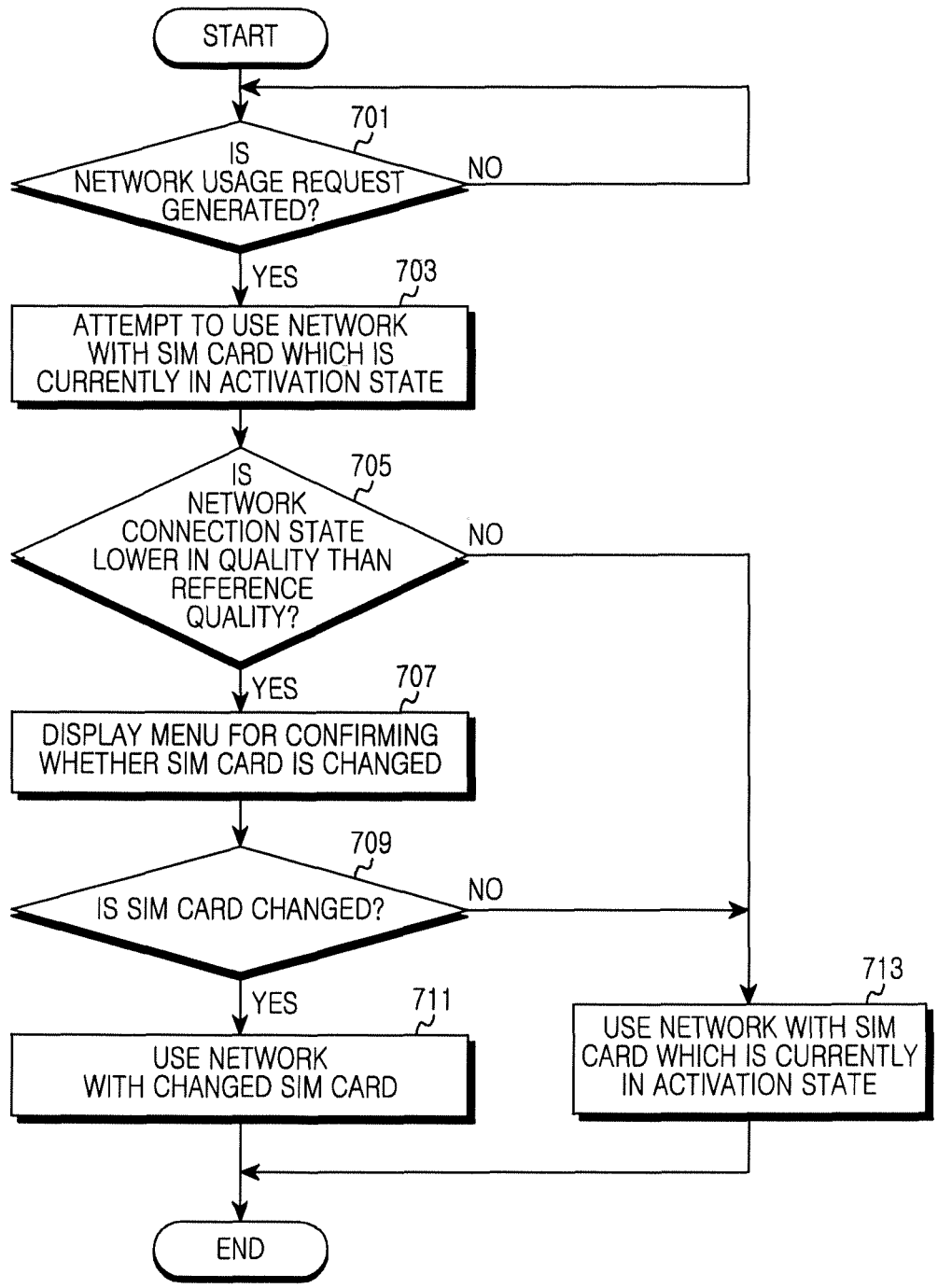
FIG. 7 illustrates a process of changing a different SIM card based on network connection quality in an electronic device according to various exemplary embodiments of the present disclosure.

In another exemplary embodiment, as illustrated in FIG. 7, the electronic device may confirm whether to change the SIM card based on network quality.

FIG. 7 illustrates a process of changing a different SIM card based on network connection quality in an electronic device according to various exemplary embodiments of the present disclosure.

Referring to FIG. 7, the electronic device confirms whether a network usage request is generated in step 701. For example, the electronic device may confirm whether the network usage request is generated to provide at least one service among a text service, a call service, and a data service. In this case, the electronic device may periodically confirm whether the network usage request is generated.

If the network usage request is generated, in step 703, the electronic device attempts to use a network with a SIM card which is currently in an activation state. For example, the electronic device may attempt to use the network by using the SIM card which is currently in the activation state to provide at least one service among a text service, a call service, and a data service.

In step 705, the electronic device confirms whether a network connection state is lower in quality than reference quality. Herein, the reference quality may include at least one of a connection response time, a transfer rate, a signal strength, and a noise with respect to a BS. It is assumed herein that the reference quality is input by a user, or is pre-stored in a system, or is transmitted from a server. For example, the electronic device may confirm whether the connection response time with respect to the BS is a time further delayed than the reference connection response time. For another example, the electronic device may confirm whether the transfer rate is slower than a reference transfer rate. For another example, the electronic device may confirm whether the signal strength is lower in level than a reference signal strength. For another example, the electronic device may confirm whether the noise is higher in level than a reference noise.

If the network connection state is not lower in quality than the reference quality, in step 713, the electronic device may use the network with the SIM card which is currently in the activation state.

Otherwise, if the network connection state is lower in quality than the reference quality, in step 707, the electronic device displays a menu for confirming whether the SIM card is changed. For example, as illustrated in FIG. 9D, since the network connection state of the SIM card (i.e., $1^{st}$ SIM) which is currently in the activation state is not constant, the electronic device may display a menu 931 for confirming whether to change to the different SIM card (i.e., $2^{nd}$ SIM). In this case, as illustrated in FIG. 9D, the electronic device may display information of the SIM card (i.e., $1^{st}$ SIM), which is currently in the activation state, in a notification area (see 907).

In step 709, the electronic device confirms whether the SIM card is changed. For example, as illustrated in FIG. 9D, the electronic device may confirm whether to change the SIM card based on any one of a "yes" 933 and a "no" 935 selected from the menu 931 for confirming the SIM card change. In addition, if any one of the "yes" 933 and the "no" 935 is not selected during a reference time, the electronic device may release the display of the menu 931 for confirming the SIM card change.

If the SIM card is not changed, in step 713, the electronic device uses the network with the SIM card which is currently in the activation state. For example, as illustrated in FIG. 9D, if the "no" 935 is selected from the menu 931 for confirming the SIM card change, the electronic device may use the network with the SIM card (i.e., $1^{st}$ SIM) which is currently in the activation state.

Otherwise, if the SIM card is changed, in step 711, the electronic device uses the network with the changed SIM card. For example, as illustrated in FIG. 9D, if the "yes" 933 is selected from the menu 931 for confirming the SIM card change, the electronic device may use the network by changing to the SIM card (i.e., $2^{nd}$ SIM). In this case, as illustrated in FIG. 9E, the electronic device may display a notification window 941 for notifying the change to the $2^{nd}$ SIM. In addition, as illustrated in FIG. 9E, the electronic device may display the change to the $2^{nd}$ SIM in a notification area (see 943).

In the aforementioned exemplary embodiment, the electronic device may confirm whether to change the SIM card based on at least one condition among each SIM card's free usage amount, usage fee, occurrence or non-occurrence of network error, and network connection quality.

Figure 10:
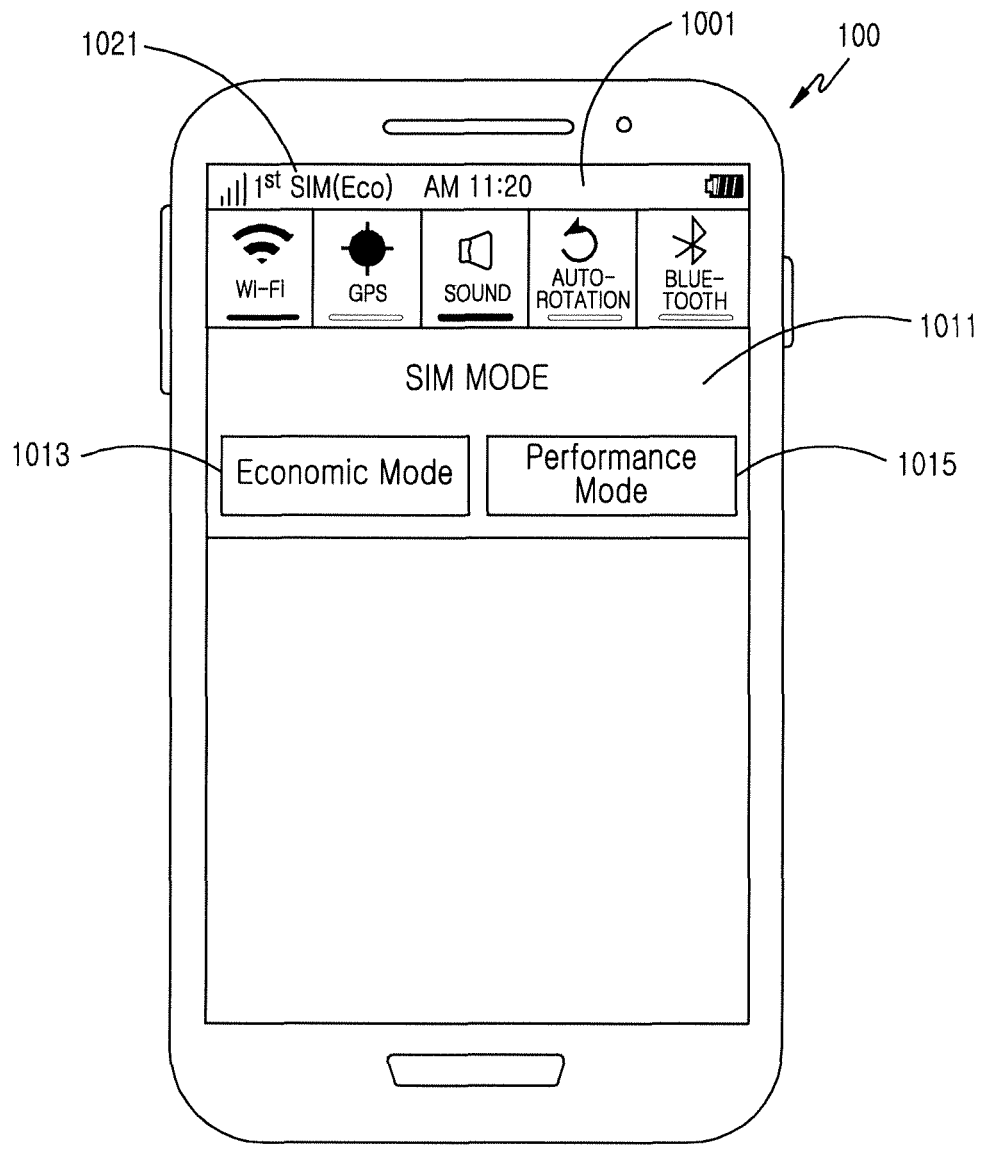

In another exemplary embodiment, as illustrated in FIG. 10, a notification area 1001 may include a menu for setting a "SIM mode" 1011 which includes an "economic mode" 1013 for confirming whether the SIM card is changed based on at least one of each card's free usage amount and usage fee and a "performance mode" 1015 for confirming whether the SIM card is changed based on at least one of a occurrence or non-occurrence of network error and network connection quality. In this case, the electronic device may display at least one of information of the SIM card currently in the activation state and mode information in the notification area 1001 (see 1021).

In the aforementioned exemplary embodiment, the electronic device displays a menu for changing a SIM card, and controls the SIM card change based on a menu selection. In this case, the electronic device may perform the SIM card change without a menu display. In addition, the electronic device may provide control to change to the selected SIM card by displaying a SIM card list.

In addition, if a text message is transmitted to a plurality of recipients, the text message may be transmitted by using each SIM card which stores a contact number of each recipient. In this case, if the contact number is selected, a menu for selecting a SIM card to be used to transmit the text message may be displayed.

As described above, since a SIM card in use is changed to a different SIM card based on a SIM card usage condition among a plurality of SIM cards, users can use the SIM cards according to a situation.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the disclosure is defined not by the detailed description of the disclosure but by the appended claims and their equivalents, and all differences within the scope will be construed as being included in the present disclosure.

What is claimed is:

1. A method of controlling a subscriber identity module (SIM) in an electronic device, the method comprising:
   setting a SIM mode selected between a first mode and a second mode based on a user input, wherein the first mode in which a SIM card to be used is determined based on a free usage amount and a usage fee, and the second mode in which the SIM card to be used is determined based on an occurrence of network usage error and a network connection state;
   detecting a network usage request;
   when the network usage request is detected, detecting a SIM card usage condition of a first SIM card; and
   if the SIM card usage condition of the first SIM card is not satisfied with a predetermined condition of the set SIM mode, providing control to perform the network usage request via the communication module by using a second SIM card, a SIM card usage condition of the second SIM card satisfying the predetermined condition of the set SIM mode.

2. The method of claim 1, wherein determining whether to change the SIM card comprises:
   determining whether there is a remaining balance of a free usage amount of the first SIM card; and
   when there is no remaining balance of the free usage amount of the first SIM card, determining whether to use the second SIM card having the remaining balance of the free usage amount.

3. The method of claim 2, further comprising:
   if there is no remaining balance of the free usage amount of the first and second SIM cards, comparing each SIM card's usage fee; and
   determining whether to use a SIM card having a cheapest usage fee based on a result of the comparison.

4. The method of claim 1, wherein determining whether to change the SIM card comprises:
   comparing each SIM card's usage fee; and
   determining whether to use a SIM card having a cheapest usage fee based on a result of the comparison.

5. The method of claim 1, wherein determining whether to change the SIM card comprises, when a network usage error occurs, determining whether to use the second SIM card.

6. The method of claim 1, wherein determining whether to change the SIM card comprises:
   comparing a network connection state and reference quality; and
   when the network connection state is lower in quality than the reference quality, determining whether to second SIM card.

7. The method of claim 1, wherein determining whether to change the SIM card comprises:
   displaying a menu for confirming whether to use the second SIM card; and
   determining whether to use the second SIM card based on a selection of the displayed menu.

8. The method of claim 1, further comprising, when the first SIM card is changed, displaying that the first SIM card in use is changed.

9. An electronic device for controlling a SIM card usage, the electronic device comprising:
   a memory;
   a communication module;
   a display; and
   at least one processor configured to:
      set a SIM mode selected between a first mode and a second mode based on a user input, wherein the first mode in which a SIM card to be used is determined based on a free usage amount and a usage fee, and the second mode in which the SIM card to be used is determined based on an occurrence of network usage error and a network connection state,
      detect a network usage request,
      detect a SIM card usage condition of a first SIM card when the network usage request is detected,
      if the SIM card usage condition of the first SIM card is not satisfied with a predetermined condition of the set SIM mode, provide control to perform the network usage request via the communication module by using a second SIM card, a SIM card usage condition of the second SIM card satisfying the predetermined condition of the set SIM mode.

10. The electronic device of claim 9, wherein the processor is configured to confirm whether there is a remaining balance of a free usage amount of the first SIM card in the memory; and when there is no remaining balance of the free usage amount of the first SIM card, determine whether to use the second SIM card having the remaining balance of the free usage amount.

11. The electronic device of claim 10, wherein when there is no remaining balance of the free usage amount of the first and the second SIM cards, the processor is configured to compare each SIM card's usage fee stored in the memory, and determine whether to use a SIM card having a cheapest usage fee based on a result of the comparison.

12. The electronic device of claim 9, wherein the processor is configured to compare each SIM card's usage fee stored in the memory, and determine whether to use a SIM card having a cheapest usage fee on the based a result of the comparison.

13. The electronic device of claim 9, wherein when a network usage error occurrence is confirmed via the communication module, the processor is configured to determine whether to use the second SIM card.

14. The electronic device of claim 9, wherein the processor is configured to confirm a network connection state via the communication module and compare the network connection state with reference quality stored in the memory, and when the network connection state is lower in quality than the reference quality, determine whether to use the second SIM card.

15. The electronic device of claim 9, wherein the processor is configured to provide control to display a menu for confirming whether to use the second SIM card via the display, and determine whether to use the second SIM card based on a selection of the displayed menu.

16. The electronic device of claim 9, wherein if the first SIM card is changed, the processor is configured to control the display to display that the first SIM card is changed.

\* \* \* \* \*